APPARATUS FOR MANUFACTURING MAGNETIC RECORDING TAPE

Filed March 25, 1960

INVENTORS
REGINALD A. HACKLEY &
DAVID F. MARTIN

BY W. S. Hill
AGENT

United States Patent Office 3,162,792

Patented Dec. 22, 1964

3,162,792
APPARATUS FOR MANUFACTURING MAGNETIC RECORDING TAPE

Reginald A. Hackley, Princeton, and David F. Martin, Trenton, N.J., assignors to Radio Corporation of America, a corporation of Delaware Filed Mar. 25, 1960, Ser. No. 17,516
13 Claims. (Cl. 317—203)

This invention relates to electrical apparatus for orienting magnetic particles in a binder therefor, during the manufacture of magnetic recording tape; and particularly to electrical apparatus for producing a directed magnetic field which may be used economically in the manufacture of said tape.

In manufacturing magnetic recording tape, a fluid mixture of magnetic particles, a binder, and a vehicle therefor is coated on a continuous wet backing and then dried thereon. In order to improve the performance characteristics of the product, the magnetic particles are oriented to lie in the direction in which the head scans the tape during its use. The magnetic particles are oriented by applying a magnetic field in the desired direction to the coating as it passes between the coater and the drier. Several orienting methods have been proposed which provide the desired orienting magnetic field.

One class of methods passes the wet coating adjacent to one or more permanent magnets in prescribed positions with respect to the coating during its manufacture. The use of permanent magnets has the disadvantage that the orienting magnetic field is not easily adjustable to various conditions of manufacture; for example, different coating speeds, different coating techniques, different coating compositions, etc., with the result that the optimum conditions for manufacture are not easily attained for most combinations.

Another class of methods uses one or more coils energized with direct current as substitutes for the permanent magnets described above. Such energized coils may be made adjustable. However, such coils are generally quite bulky and expensive and are uneconomical of the electric power required to operate them. This is for the reason that the apparatus does not concentrate the magnetic field energy in the region in which the magnetic particles are oriented. Methods using air cored solenoids generally have the further disadvantage that they subject the tape to an orienting magnetic field for too long a period of time resulting in a clumping of magnetic particles in the coating.

An object of this invention is to provide improved electrical apparatus for orienting magnetic particles during the manufacture of a magnetic recording tape.

Another object is to provide electrical apparatus which produces an orienting magnetic field for magnetic recording tape manufacture, which field is applied for a short defined period of time and is easily adjustable to a desired value within a useful range of operation.

A further object is to provide electrical apparatus which produces a directed orienting magnetic field for magnetic tape manufacturing which produces satisfactory orienting magnetic fields but is nevertheless economical to build, operate, and maintain.

In general, the electrical apparatus of the invention comprises a coil of wire having a longitudinal axis therethrough, a pair of confronting spaced apart core portions disposed on opposite sides of said axis, and means, such as a shell of high permeability material around said coil and including said core portions, defining a closed low reluctance magnetic circuit around said coil through each of said core portions. Each of the core portions has therein a gap transverse to said longitudinal axis and positioned to be opposed to one another. The apparatus may include adjustable means for energizing the coil; and means defining a path for passing magnetic recording tape through the slot formed by the spaced apart core portions.

In operation, the apparatus is stationary and the magnetic recording tape with its coating still wet passes through the slot formed by the spaced apart core portions in the coil. When the coil is energized, as with adjustable energizing means connected thereto, the current flowing in the coil produces magnetic flux which is concentrated in the low reluctance magnetic circuit except at the opposed gaps. At the gaps, magnetic flux lines fringe out from the gaps towards one another. Because of their polarity, the magnetic flux lines from each gap repel the flux lines from the other gap. At about the axis through the coil, the interaction of a portion of the fringing magnetic flux lines from each gap forms a plane where the resultant magnetic field is parallel to the axis through the coil. The wet coating is positioned to pass through the slot in a direction parallel to the axis through the coil and along the aforemenioned plane. In its passage, the wet coating is subjected to a short, strong, unidirectional field which orients the magnetic particles in the coating parallel to the direction in which the coating passes through the slot.

The apparatus may be adjusted to provide optimum resultant magnetic field strengths over the short distance in which particle orientation takes place. This may be achieved with smaller coils of wire and with lesser amounts of operating current than in previous apparatus, because the magnetic flux produced by the coil is concentrated in a low reluctance magnetic circuit except over the short region where particle orientation takes place. As a result, the apparatus herein requires a lower initial cost and a lower cost of operation. In addition, the adjustable energizing means provides improved adjustability within a useful range of operation.

In the drawing.

Similar reference numerals are used for similar structures throughout the drawing.

Figures 1, 2, 3, 4:
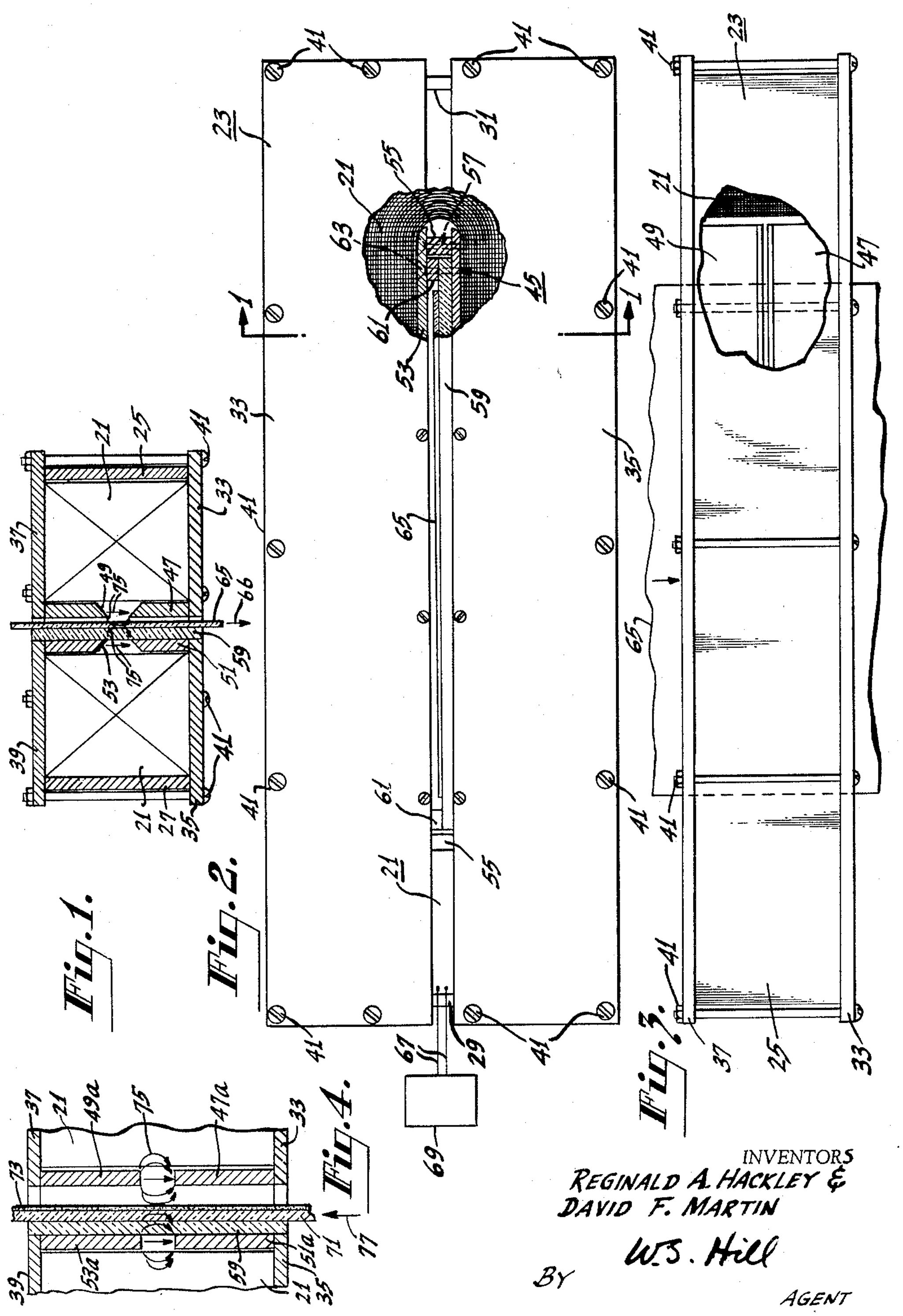
FIGURE 1 is a partially sectional end view of an embodiment of the invention.
FIGURE 2 is a partially broken away, partially-schematic front view of the embodiment of FIGURE 1.
FIGURE 3 is a partially broken away, top view of the embodiment of FIGURE 1.
FIGURE 4 is a fragmentary view of another embodiment of the invention.

FIGURES 1, 2 and 3 are views of the same embodiment of the invention. The apparatus comprises a coil 21 of wire including an opening therethrough. A longitudinal axis extends through the opening in the coil 21, which axis is preferably, but need not necessarily be, coincident with the axis of symmetry of the coil. The longitudinal axis is, however, the axis of symmetry of the core portions described below.

The coil 21 itself is about 8.00 inches high, 23.87 inches wide and 3.87 inches thick. The opening through the coil 21 entends through the thickness of the coil 21 and is about 1.12 inches high and 16.37 inches wide. The opening through the coil 21 is centrally located with respect to the height and width of the coil, but the location of the opening in the coil is not critical. Further the coil 21 may occupy a volume less than the entire space within the shell 23.

The coil 21 is made up of 900 turns of No. 10 square copper wire. The opening through the coil 21 has a height substantially less than its width, being made large enough to receive a core assembly 45 which is described below. Alternatively, the coil may be made of wire of other shapes, sizes and materials. For example, the wire may be round, and may be made of silver or aluminum.

A shell 23 of high permeability material surrounds said coil 21 which provides low reluctance magnetic flux paths around the coil. The shell 23 is of 5/16" cold rolled steel plate and preferably covers substantially the entire surface of the coil 21. The shell 23 may be made of any high magnetic permeability material such as steel or various alloys of steel. The shell 23 may be comprised of any combinations of plates or sheets of any suitable thickness which provide a continuity of magnetic flux path over the surface of the coil 21. As shown in FIGURES 1, 2 and 3, the shell 23 comprises a top panel 25, a bottom panel 27, a left end panel 29, a right end panel 31, a top front panel 33, a bottom front panel 35, a top back panel 37, a bottom back panel 39, and a core assembly 45. The various panels are held together with holding screws 41 placed at suitable positions around the shell 23.

The core assembly 45 includes the core portions 47 and 49, 51 and 53; together with means 55 and 57 for maintaining the core portions in the desired confronting spaced apart relation and means 59 and 61 defining a path for magnetic tape between the core portions. The core assembly 45 is an important feature of the invention and is designed to be easily removable and insertable to aid flexibility in using the apparatus. One core portion of the core assembly 45 comprises a top front piece 47 and a top back piece 49 which are arranged in a single plane over the top face of the opening in the coil 21. The other core portions of the core assembly 45 includes a bottom front piece 51 and a bottom back piece 53 in a single plane and is positioned over the bottom face of the opening in the coil 21. The plane of the two top pieces 47 and 49 and the plane of the two bottom pieces 51 and 53 are spaced apart a prescribed distance with spacers 55 held with spacer screws 57, which spacing defines the height of the slot therebetween. The size and spacing of the pieces 47, 49, 51 and 53 are such as to fit snugly in the opening of the coil 21.

Core portions 47 and 49 are separated by a gap as are core portions 51 and 53, and all core portions are connected into a magnetic circuit with the shell 23 and extend through the coil opening to define a narrow slot therethrough. The core portions 47 and 49 and the core portions 51 and 53 are disposed on opposite sides of said axis in said coil in confronting, spaced apart relation. The overall dimensions of the apparatus are about 9.50 inches high, about 25.37 inches wide, and about 4.50 inches thick. The slot defined by the core portions extends through the thickness of the apparatus and is about 0.50 inch high and 14.00 inches wide. The slot through the shell 23 is centrally located with respect to the height and width of the apparatus.

The top front piece 47 and top back piece 49 of the one core portion are spaced from each other a short distance, which distance is referred to hereinafter as the upper gap. The size of the upper gap is such as to provide a fringing magnetic field which extends out into the opening when the coil 21 is energized. As shown in FIGURE 1, the edges of the top pieces 47 and 49 which face one another are beveled at a 45° angle with the pointed corner of the bevel nearest the longitudinal axis through the coil 21. The upper pieces 47 and 49 and the gap therebetween is shown in the broken away part of FIGURE 3. The shape of the upper gap may be varied to suit the particular purposes for which the apparatus is to be used. Thus, rounded corners or square corners are considered equivalents of the beveled edges illustrated in FIGURE 1. By way of example, the gap between the top pieces 47 and 49 is 0.62 inch at their closest approach and is uniform over its length. The bottom front and back pieces 51 and 53 of the other core portion are also spaced from each other a short distance, which distance is referred to hereinafter as the lower gap. As shown in FIGURE 1, the lower gap is identical in configuration with the upper gap except that it is a mirror image thereof around the longitudinal axis through the coil 21. Both the upper and lower gaps are opposed and extend across substantially the entire face of the slot in a direction transverse to the longitudinal axis in the coil 21. The two top pieces 47 and 49 and the two bottom pieces 51 and 53 are also made of a high magnetic permeability material of suitable thickness, such as 5/16" thick cold rolled steel plate. All of the panels and pieces of the shell and core assembly are fitted to close tolerances in order to reduce or eliminate any undesired gaps in the low reluctance magnetic flux path except at the desired upper and lower gaps.

A support 59 defining the path for the magnetic tape 65 passing through the slot in the coil 21 is positioned on top of the bottom front and back pieces 51 and 53. The support 59 is held in position with a support spacer 61 and screws for the support 63 as part of the core assembly 45. The support 59 is made of a non-magnetic material, such as a plastic, and has a thickness such that, when the back of the recording tape 65 rests thereon, the center of the thickness of the magnetic coating to be oriented is on the plane magnetic field parallel to the longitudinal axis in the coil 21 as described below.

Two leads 67 come out of the coil 21 and attach to an adjustable D.C. voltage source 69 which is shown schematically in FIGURE 2. In operation, the voltage source 69 is adjusted to provide the desired current flow through the leads 67 and the coil 21. The coil 21 may carry between 1 and 10 amperes, preferably about 6 amperes. The current flow in the coil generates a magnetic field in a particular direction, its direction being opposite for opposite directions of current flow in the coil 21. The flux of the magnetic field produced thereby is concentrated in the high magnetic permeability shell 23, except where the flux must jump the upper or the lower gaps. At the gaps, the flux 75 of the magnetic field across each gap fringes out toward the longitudinal axis through the coil 21. The fringing magnetic fields oppose one another. The vector sum of portions of the two fringing fields produces a plane field parallel to the longitudinal axis in the coil near the center of the space between the top pieces 47 and 49 and the bottom pieces 51 and 53. A tape 65 to be oriented is passed through the slot in the direction shown by the arrow 66 along the plane field, where the particles in the wet coating of the tape are oriented parallel to the direction of travel of the tape 65 by the action of the magnetic flux thereon. The portion of the magnetic field used for orienting magnetic particles extends over only a short distance along the axis through the coil. Such a configuration of the magnetic field is especially desirable for orienting magnetic particles in a recording tape, because it helps to limit particle migration in the wet coating by reducing the application of the orienting field to a shorter defined period of time.

Another embodiment of the invention is shown in FIGURE 4, which is similar to the embodiment of FIGURE 1 except that (1) the edges facing the gap of the top pieces 47a and 49a and the bottom pieces 51a and 53a of the core assembly 45 are square instead of beveled; (2) the top and bottom pieces 47a, 49a, 51a, and 53a are of ½ inch cold rolled steel; (3) the coil is comprised of 1700 turns of No. 17 copper wire; (4) the gaps are 0.50 inch; and the direction of the tape travel is reversed. FIGURE 4 shows also the position of the magnetic tape during its passage through the slot in the shell 23. The tape backing 71 rests on the support 59 for the tape and moves in the direction shown by the arrow 77. The tape coating 73 in its still wet condition is on the side of the tape backing 71 away from the support 59. FIGURE 4 shows also a schematic representation of flux lines 75 as they are believed to exist when the coil 21 is energized. The table below gives data taken on the apparatus of FIGURE 4. The current through the coil was measured with an ammeter in the energizing circuit for the coil. The magnetic field in the region of orientation was measured by placing a flux meter coil in the region of interest and adjusting the current through the coil in steps. The tape orientation is a figure of merit computed from measurements taken on tape samples drawn through the coil with the tape coating still wet, each with the corresponding value of current flowing in the coil.

*Table*

| Current [a] | Field [b] | Tape Orientation [c] |
|---|---|---|
| 0.0 | 0 | [d] .600 |
| 0.5 | 550 | .696 |
| 1.0 | 1,080 | .737 |
| 1.5 | 1,650 | .767 |
| 2.0 | 2,180 | .770 |

[a] Current in amperes.
[b] Field in oersteds measured midway between core portions and opposite gaps.
[c] Value of $B_r/4\pi I$ at 1000 oersteds.
[d] Nominal value.

There have been described apparatus improved over previous orienting apparatus in that, because of its structure and geometry, it provides an optimum magnetic field parallel to the axis of the coil 21 over the short distance where it is required for particle orientation and in all other places finds a low reluctance path for the magnetic field. As a result, the coil may be made considerably smaller, requires markedly less current to operate, and may be adjusted with simple equipment for the range of currents with which the coil is energized. Thus, there has been described apparatus for orienting particles during the manufacture of magnetic recording tape which is markedly cheaper to build and operate, and is markedly more flexible and more adaptable than previous apparatus.

What is claimed is:

1. Electrical apparatus for orienting magnetic particles in magnetic recording tape during the manufacture thereof comprising a coil of wire having a longitudinal axis therethrough; a core in said coil, said core being split and spaced apart into two confronting portions on each side of said longitudinal axis, each of said portions being further split in a direction transverse to said axis into two pieces and spaced to provide a gap of a predetermined distance, said gaps being opposed to one another; and a closed magnetic flux path connected to each of said portions.

2. Electrical apparatus for orienting magnetic particles in magnetic recording tape during the manufacture thereof comprising a coil of wire having a longitudinal axis therethrough; a core in said coil, said core being split and spaced apart into two confronting portions on each side of said longitudinal axis, each of said portions being further split in a direction transverse to said longitudinal axis into two pieces and spaced to provide a single gap of a predetermined distance, said gaps being opposed to one another; a closed magnetic flux path connected to each of said portions; and means defining a path for said magnetic tape between said core portions along said longitudinal axis.

3. Electrical apparatus for orienting magnetic particles in magnetic recording tape during the manufacture thereof comprising a coil of wire having a longitudinal axis therethrough; a pair of confronting spaced apart core portions disposed on opposite sides of said longitudinal axis in said coil, each of said core portions having therein a gap transverse to said longitudinal axis and opposed to one another; means including said core portions defining a magnetic circuit around said coil through each of said core portions, and a non-magnetic support in said slot adjacent one of said core portions defining a path for said magnetic tape.

4. Electrical apparatus for orienting magnetic particles in magnetic recording tape during the manufacture thereof comprising a coil of wire having a longitudinal axis therethrough; a pair of confronting spaced apart core portions disposed on opposite sides of said longitudinal axis in said coil, each of said core portions having therein a single gap transverse to said longitudinal axis and opposed to one another; and a shell of high magnetic permeability material around said coil completing a magnetic circuit through each of said core portions.

5. Electrical apparatus for orienting magnetic particles in magnetic recording tape during the manufacture thereof comprising a coil of wire having a longitudinal axis therethrough; a pair of confronting spaced apart core portions disposed on opposite sides of said longitudinal axis in said coil, each of said core portions having therein a gap transverse to said longitudinal axis and opposed to one another; means including said core portions defining a magnetic circuit around said coil through each of said core portions; and means defining a path for said magnetic tape between said core portions along said longitudinal axis.

6. Electrical apparatus for orienting magnetic particles in magnetic recording tape during the manufacture thereof comprising a coil of wire having a longitudinal axis therethrough; a pair of confronting spaced apart core portions disposed on opposite sides of said axis in said coil, each of said core portions having therein a single gap transverse to said longitudinal axis and opposed to one another; a shell of high magnetic permeability material around said coil completing a magnetic circuit through each of said core portions; and adjustable means for energizing said coil connected thereto.

7. Electrical apparatus including a coil of wire having an opening therethrough, and a shell of high magnetically permeable material surrounding said coil and a core extending within said opening for concentrating the magnetic flux produced by current flowing in said coil, said core being divided into a pair of spaced portions defining a narrow slot through said opening, said portions having two opposed gaps disposed within said portions and extending transverse to the direction of said slot.

8. Electrical apparatus comprising a coil of wire having an opening therethrough, and a shell of high magnetic permeability material over the surfaces of said coil and two spaced core portions extending within said opening, said core portions defining a rectangular slot through said coil, said slot having a substantially greater width than height; each core portion having a single gap therein opposed to the other gap and extending transverse to the direction of said slot and across a substantial part of each of said portions.

9. Electrical apparatus for orienting magnetic particles during the manufacture of magnetic recording tape comprising a coil of wire including an opening therethrough, and a high magnetic permeability shell over the surfaces of said coil, core portions extending within said opening, which core portions are opposed, substantially parallel and spaced apart a relatively short distance from each other defining a narrow slot therethrough, said core portions having opposed gaps therein, said gaps extending at substantially right angles to the direction of said opening and extending across a substantial part of each of said portions, and a non-magnetic support in said slot adjacent one of said core portions defining a path for said magnetic tape.

10. Electrical apparatus for orienting magnetic particles during the manufacture of magnetic recording tape subsequent to the coating of said particles on a support therefor and prior to the drying thereof comprising a coil of wire having an opening therethrough, and a shell of high magnetic permeability material over the surfaces of said coil, and a pair of core portions extending within said opening which core portions are opposed, substantially parallel and spaced apart a relatively short distance from each other defining a narrow slot therethrough, each core portion having a single gap therein, said gaps being opposed to one another and perpendicular to the direction of said opening and extending across the entire length of each of said core portions.

11. The electrical apparatus of claim 10 including means for positioning said tape in a desired position in said slot.

12. The electrical apparatus of claim 10 including also adjustable means for energizing said coil.

13. Electrical apparatus for orienting magnetic particles during the manufacture of magnetic recording tape subsequent to coating said particles on a support therefor and prior to the drying thereof comprising a coil of 900 turns of No. 10 square copper wire and having a centrally-located opening through said coil, and a shell of 5/16" cold rolled steel over the surfaces of said coil, a pair of confronting, uniformly spaced, flat-surfaced core portions extending within said opening defining a narrow slot therethrough, each having a single gap therein of identical configuration each core portion positioned so that each gap opposes the other gap, each of said gaps being perpendicular to the direction of said opening and extending across the entire width of its particular core portion, and a non-magnetic support in said slot adjacent one of said core portions defining a path for said magnetic tape.

References Cited in the file of this patent

UNITED STATES PATENTS

| | | |
|---|---|---|
| 2,586,559 | Page | Feb. 19, 1952 |
| 2,711,901 | Von Behren | June 28, 1955 |
| 2,796,359 | Speed | June 18, 1957 |
| 2,999,907 | Hoshino et al. | Sept. 12, 1961 |
| 3,001,891 | Stoller | Sept. 26, 1961 |
| 3,021,230 | Deriaud | Feb. 13, 1962 |